United States Patent [19]

(12) United States Patent
Ly et al.

(10) Patent No.: US 11,962,466 B2
(45) Date of Patent: *Apr. 16, 2024

(54) BANDWIDTH PART SWITCHING FOR DUAL ACTIVE PROTOCOL STACK HANDOVER

(71) Applicant: QUALCOMM Incorporated, San Diego, CA (US)

(72) Inventors: Hung Dinh Ly, San Diego, CA (US); Wanshi Chen, San Diego, CA (US); Peter Pui Lok Ang, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,911

(22) Filed: Dec. 19, 2022

(65) Prior Publication Data

US 2023/0224222 A1 Jul. 13, 2023

Related U.S. Application Data

(63) Continuation of application No. 16/949,033, filed on Oct. 9, 2020, now Pat. No. 11,563,637.

(60) Provisional application No. 62/914,849, filed on Oct. 14, 2019, provisional application No. 62/914,526, filed on Oct. 13, 2019.

(51) Int. Cl.
*H04L 41/0896* (2022.01)
*H04W 36/00* (2009.01)

(52) U.S. Cl.
CPC ..... *H04L 41/0896* (2013.01); *H04W 36/0069* (2018.08)

(58) Field of Classification Search
None
See application file for complete search history.

(56) References Cited

U.S. PATENT DOCUMENTS

| | | | |
|---|---|---|---|
| 6,690,936 B1 * | 2/2004 | Lundh | H04B 7/02 370/335 |
| 11,316,254 B2 * | 4/2022 | Kim | H01Q 3/00 |
| 2004/0235478 A1 * | 11/2004 | Lindquist | H04W 36/0085 455/436 |

(Continued)

FOREIGN PATENT DOCUMENTS

| | | |
|---|---|---|
| WO | 2018085049 A1 | 5/2018 |
| WO | 2019158291 A1 | 8/2019 |

OTHER PUBLICATIONS

Qualcomm Incorporated: "Enhanced MBB NR Handover Interruption Requirements", 3GPP TSG-RAN WG4 Meeting #92, R4-1908487, Ljubljana, Slovenia, Aug. 26, 2019-Aug. 30, 2019, Aug. 2019, pp. 1-8.

(Continued)

*Primary Examiner* — Lonnie V Sweet
(74) *Attorney, Agent, or Firm* — Harrity & Harrity, LLP

(57) ABSTRACT

Various aspects of the present disclosure generally relate to wireless communication. In some aspects, a base station may configure a bandwidth part (BWP) switching configuration of a user equipment in connection with a dual active protocol stack (DAPS) handover based at least in part on a BWP switching rule; and perform the DAPS handover. Numerous other aspects are provided.

20 Claims, 9 Drawing Sheets

(56) References Cited

U.S. PATENT DOCUMENTS

| | | | |
|---|---|---|---|
| 2011/0149913 A1* | 6/2011 | Park | H04W 36/0069 370/332 |
| 2012/0071190 A1* | 3/2012 | Choi | H04L 5/0037 455/517 |
| 2013/0023281 A1* | 1/2013 | Meredith | H04W 36/008375 455/456.1 |
| 2014/0286170 A1* | 9/2014 | Ericson | H04W 36/24 370/235 |
| 2016/0373971 A1* | 12/2016 | Kulal | H04W 36/0016 |
| 2016/0381622 A1* | 12/2016 | Xu | H04W 36/00837 455/437 |
| 2017/0006509 A1* | 1/2017 | Viering | H04W 24/10 |
| 2017/0230885 A1* | 8/2017 | Sheng | H04W 24/08 |
| 2018/0098250 A1* | 4/2018 | Vrzic | H04W 36/18 |
| 2018/0310352 A1* | 10/2018 | Wiberg | H04W 76/16 |
| 2019/0045490 A1* | 2/2019 | Davydov | H04L 5/0044 |
| 2019/0150015 A1* | 5/2019 | Wei | H04L 27/2666 370/328 |
| 2019/0182702 A1* | 6/2019 | Wang | H04W 28/0221 |
| 2019/0357262 A1* | 11/2019 | Cirik | H04W 72/04 |
| 2019/0373667 A1* | 12/2019 | Jeon | H04L 5/001 |
| 2020/0127799 A1* | 4/2020 | Orsino | H04L 25/0226 |
| 2020/0178129 A1* | 6/2020 | Siomina | H04W 36/0072 |
| 2020/0252843 A1* | 8/2020 | Yao | H04W 36/0058 |
| 2020/0280984 A1* | 9/2020 | Yi | H04L 5/0094 |
| 2020/0314717 A1* | 10/2020 | Kim | H04W 36/18 |
| 2020/0344649 A1* | 10/2020 | Xu | H04W 36/38 |
| 2021/0051611 A1* | 2/2021 | Xu | H04L 1/189 |
| 2021/0092008 A1* | 3/2021 | Yi | H04J 1/02 |
| 2021/0111960 A1 | 4/2021 | Ly et al. | |
| 2021/0243807 A1* | 8/2021 | Hooli | H04L 47/76 |
| 2022/0038985 A1* | 2/2022 | Deenoo | H04W 36/32 |
| 2022/0046666 A1* | 2/2022 | Takeda | H04W 72/1268 |
| 2022/0303838 A1* | 9/2022 | Wang | H04W 36/0069 |

OTHER PUBLICATIONS

Huawei, et al., "Further Discussion on DAPS-Based HO NR Mobility Enhancements", 3GPP TSG-RAN WG4 Meeting #92bis, 3GPP Draft; R4-1911913, 3rd Generation Partnership Project (3GPP), Mobile Competence Centre ; 650, Route Des Lucioles; F-06921 Sophia-Antipolis Cedex; France, vol. RAN WG4, No. Chengdu, China; Oct. 14, 2019-Oct. 18, 2019, Oct. 4, 2019(Oct. 4, 2019), pp. 1-5, XP051806653, paragraph [0001], paragraph [02.2], figure 1.

International Preliminary Report on Patentability—PCT/US2020/070661 The International Bureau of WIPO—Geneva, Switzerland, dated Apr. 28, 2022.

International Search Report and Written Opinion—PCT/US2020/070661—ISA/EPO—dated Feb. 2, 2021.

Qualcomm Incorporated: "On NR Enhanced MBB HO Requirements", 3GPP TSG-RAN WG4 Meeting #92-Bis, 3GPP Draft; R4-1912353-ON NR Enhanced MBB Requirements, 3rd Generation Partnership Project (3GPP), Mobile Competence Centre ; 650, Route Des Lucioles; F-06921 Sophia-Antipolis Cedex; France, vol. RAN WG4, No. Chongqing, China; Oct. 14, 2019-Oct. 18, 2019, Oct. 4, 2019 (Oct. 4, 2019), pp. 1-10, XP051794559, paragraph [04.2].

\* cited by examiner

BANDWIDTH PART SWITCHING FOR DUAL ACTIVE PROTOCOL STACK HANDOVER

CROSS-REFERENCE TO RELATED APPLICATIONS

This Patent Application is a continuation of U.S. Non-Provisional application Ser. No. 16/949,033, filed on Oct. 9, 2020, entitled BANDWIDTH PART SWITCHING FOR DUAL ACTIVE PROTOCOL STACK HANDOVER, which claims priority to U.S. Provisional Patent Application No. 62/914,526, filed on Oct. 13, 2019, and to U.S. Provisional Patent Application No. 62/914,849, filed on Oct. 14, 2019, both entitled "BANDWIDTH PART SWITCHING FOR DUAL ACTIVE PROTOCOL STACK HANDOVER," and both assigned to the assignee hereof. The disclosure of the prior Applications are considered part of and is incorporated by reference into this Patent Application.

FIELD OF THE DISCLOSURE

Aspects of the present disclosure generally relate to wireless communication and to techniques and apparatuses for bandwidth part (BWP) switching for a dual active protocol stack (DAPS) handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include configuring a bandwidth part (BWP) switching configuration of a user equipment (UE) in connection with a dual active protocol stack (DAPS) handover based at least in part on a BWP switching rule; and performing the DAPS handover.

In some aspects, a method of wireless communication, performed by a UE, may include receiving a BWP switching configuration in connection with a DAPS handover, wherein the BWP switching configuration is based at least in part on a BWP switching rule; and performing the DAPS handover.

In some aspects, a base station for wireless communication may include memory and one or more processors operatively coupled to the memory. The memory and the one or more processors may be configured to configure a BWP switching configuration of a UE in connection with a DAPS handover based at least in part on a BWP switching rule; and perform the DAPS handover.

In some aspects, a UE for wireless communication may include memory and one or more processors operatively coupled to the memory. The memory and the one or more processors may be configured to receive a BWP switching configuration in connection with a DAPS handover, wherein the BWP switching configuration is based at least in part on a BWP switching rule; and perform the DAPS handover.

In some aspects, a non-transitory computer-readable medium may store one or more instructions for wireless communication. The one or more instructions, when executed by one or more processors of a base station, may cause the one or more processors to: configure a BWP switching configuration of a UE in connection with a DAPS handover based at least in part on a BWP switching rule; and perform the DAPS handover.

In some aspects, a non-transitory computer-readable medium may store one or more instructions for wireless communication. The one or more instructions, when executed by one or more processors of a UE, may cause the one or more processors to: receive a BWP switching configuration in connection with a DAPS handover, wherein the BWP switching configuration is based at least in part on a BWP switching rule; and perform the DAPS handover.

In some aspects, an apparatus for wireless communication may include means for configuring a BWP switching configuration of a UE in connection with a DAPS handover based at least in part on a BWP switching rule; and means for performing the DAPS handover.

In some aspects, an apparatus for wireless communication may include means for receiving a BWP switching configuration in connection with a DAPS handover, wherein the BWP switching configuration is based at least in part on a BWP switching rule; and means for performing the DAPS handover.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
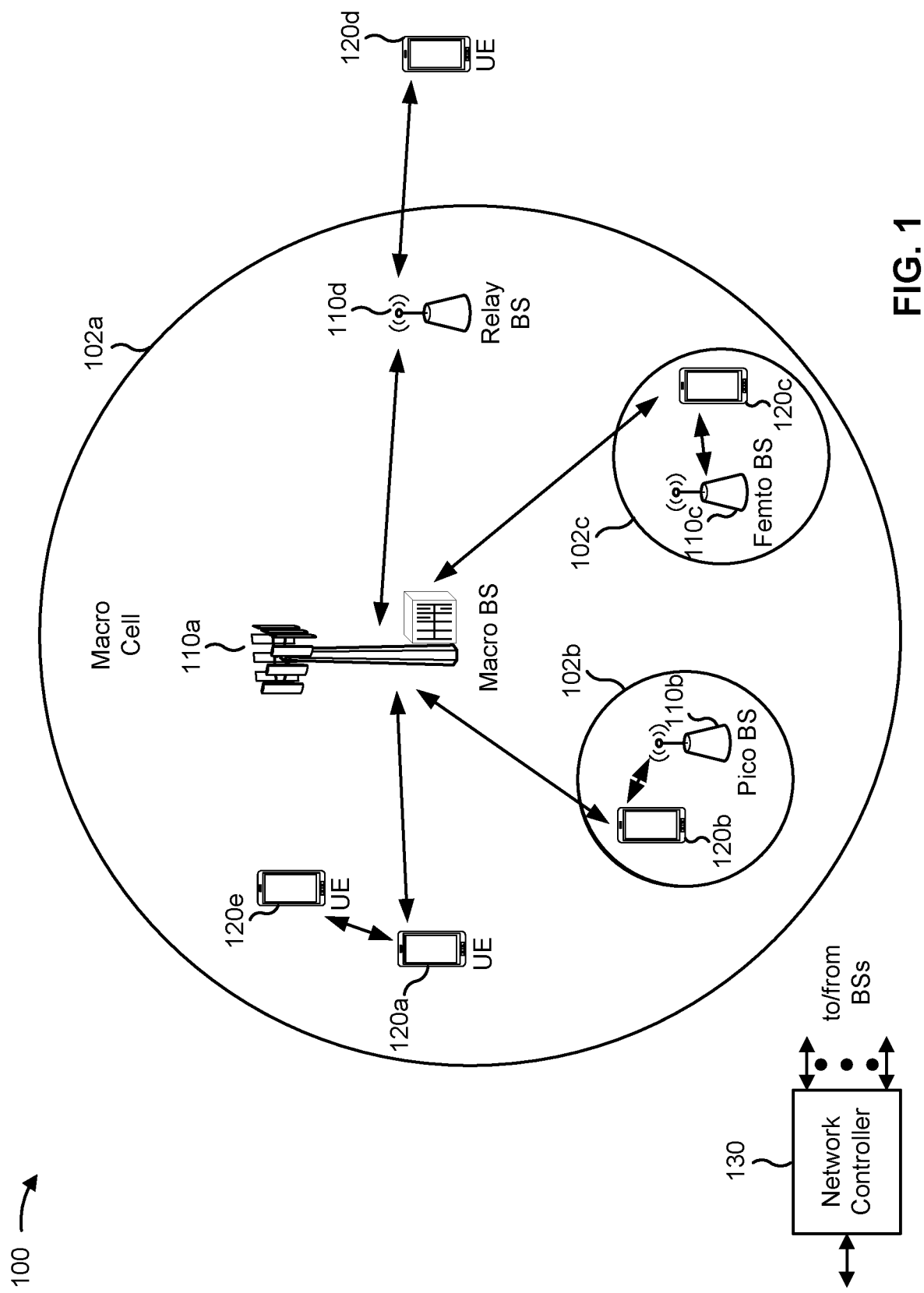
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
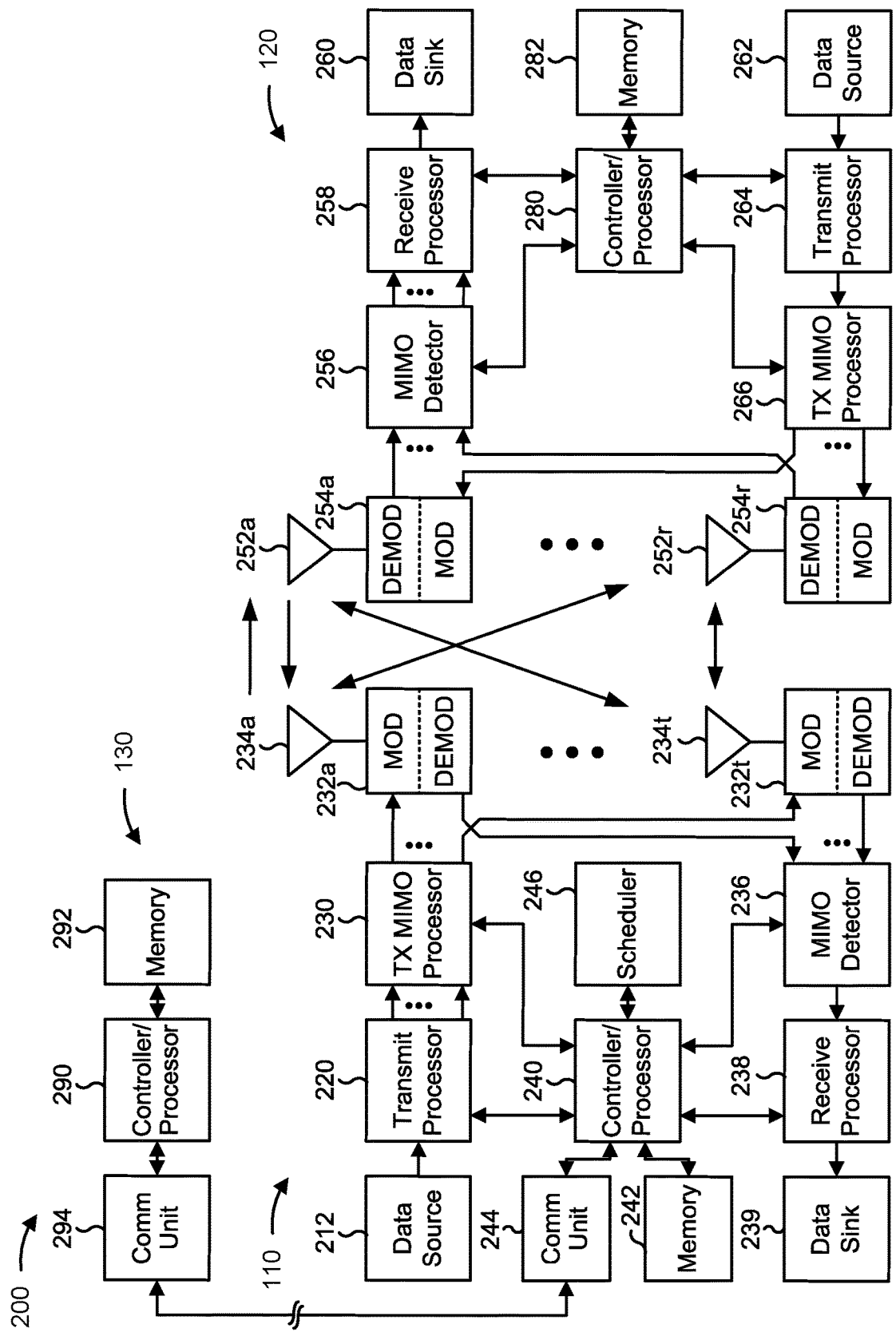
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with bandwidth part (BWP) switching for a dual active protocol stack (DAPS) handover, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving a BWP switching configuration in connection with a DAPS handover, wherein the BWP switching configuration is based at least in part on a BWP switching rule, means for performing the DAPS handover, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring a BWP switching configuration of a UE in connection with a DAPS handover based at least in part on a BWP switching rule; means for performing the DAPS handover; means for configuring the UE to switch at least one of a source BWP or a target BWP during the DAPS handover; means for configuring a source BWP of the UE as a first component carrier; means for configuring a target BWP of the UE as a second component carrier; means for configuring a source BWP of the UE as a first leg of a multi-TRP communication; means for configuring a target BWP of the UE as a second leg of the multi-TRP communication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE in connected mode may perform a handover from a source cell to a target cell. For example, the source cell may be provided by a source base station (e.g., BS 110) and the target cell may be provided by a target base station (e.g., BS 110). Some forms of handover may be associated with an interruption as the UE is handed over from the source cell to the target cell. Certain techniques may be employed to mitigate the interruption, such as a DAPS handover, which may also be referred to as a reduction in user data interruption (RUDI) handover or a make-before-break (MBB) handover. In a DAPS handover, the UE may contemporaneously connect to a source cell and a target cell so that the UE can communicate with less interruption than a break-before-make handover.

In a DAPS handover, a handover command may be conveyed to a UE using a radio resource control (RRC) message, such as an RRC reconfiguration message. The UE may maintain contemporaneous connections to the source cell and the target cell during the DAPS handover. For example, the UE may perform downlink and uplink communication on the source cell and a random access procedure on the target cell, or may perform downlink and uplink communication on the source cell and on the target cell. The UE may release the connection with the source cell after receiving an RRC message (e.g., an RRC reconfiguration message) indicating to release the connection with the source cell.

A UE may communicate using bandwidth parts (BWPs). A BWP may be defined by various parameters, such as a frequency resource (e.g., a starting or center frequency and a bandwidth), a numerology (e.g., indicating a subcarrier spacing), and/or one or more other parameters for physical channel configuration, such as for a physical downlink control channel, a physical downlink shared channel, a physical uplink control channel, a physical uplink shared channel, a random access channel, and/or the like. Different BWPs can have the same or different bandwidths, center frequencies, subcarrier spacing, and/or the like depending on the BWP configuration. Multiple BWPs can be configured for a UE, and a BWP can be activated using downlink control information (DCI). An active BWP of the UE may be switched from a first configured BWP to a second BWP using DCI. Frequency resources for uplink signals and channels of the UE may be within an uplink BWP, and frequency resources for downlink signals and channels may be within a downlink BWP.

BWP switching during a DAPS handover may present challenges. For example, some UEs may not have sufficient capabilities for switching from one active BWP to another active BWP during a DAPS handover, since this may cause interruption of the UE's communications. As another example, an impact of BWP switching may be different for an inter-frequency handover (e.g., wherein the source cell and the target cell are non-overlapped or are associated with different center frequencies) than for an intra-frequency handover, due to UE capabilities regarding retuning or communication on multiple frequencies. Still further, an impact of BWP switching may be different when a BWP of the source cell at least partially overlaps a BWP of the target cell than when the BWPs of the source cell and the target cell are non-overlapped.

Some techniques and apparatuses described herein provide rules for BWP switching during a DAPS handover. For example, a BWP switching rule may indicate that BWP switching during the DAPS handover is permitted or is not permitted. As another example, a BWP switching rule may indicate that BWP switching is permitted or not permitted for a particular communication link (e.g., uplink or downlink) during the DAPS handover. As yet another example, a BWP switching rule may be based at least in part on whether BWPs of the source cell and the target cell are overlapped, partially overlapped, or non-overlapped. Furthermore, some techniques and apparatuses described herein provide configuration of BWP switching rules for a DAPS handover, configuration of BWP switching during a DAPS handover, and/or the like. In this way, approaches for BWP switching during DAPS handover (or the prevention thereof) are provided, which improve stability and reliability of DAPS handover.

Figure 3:
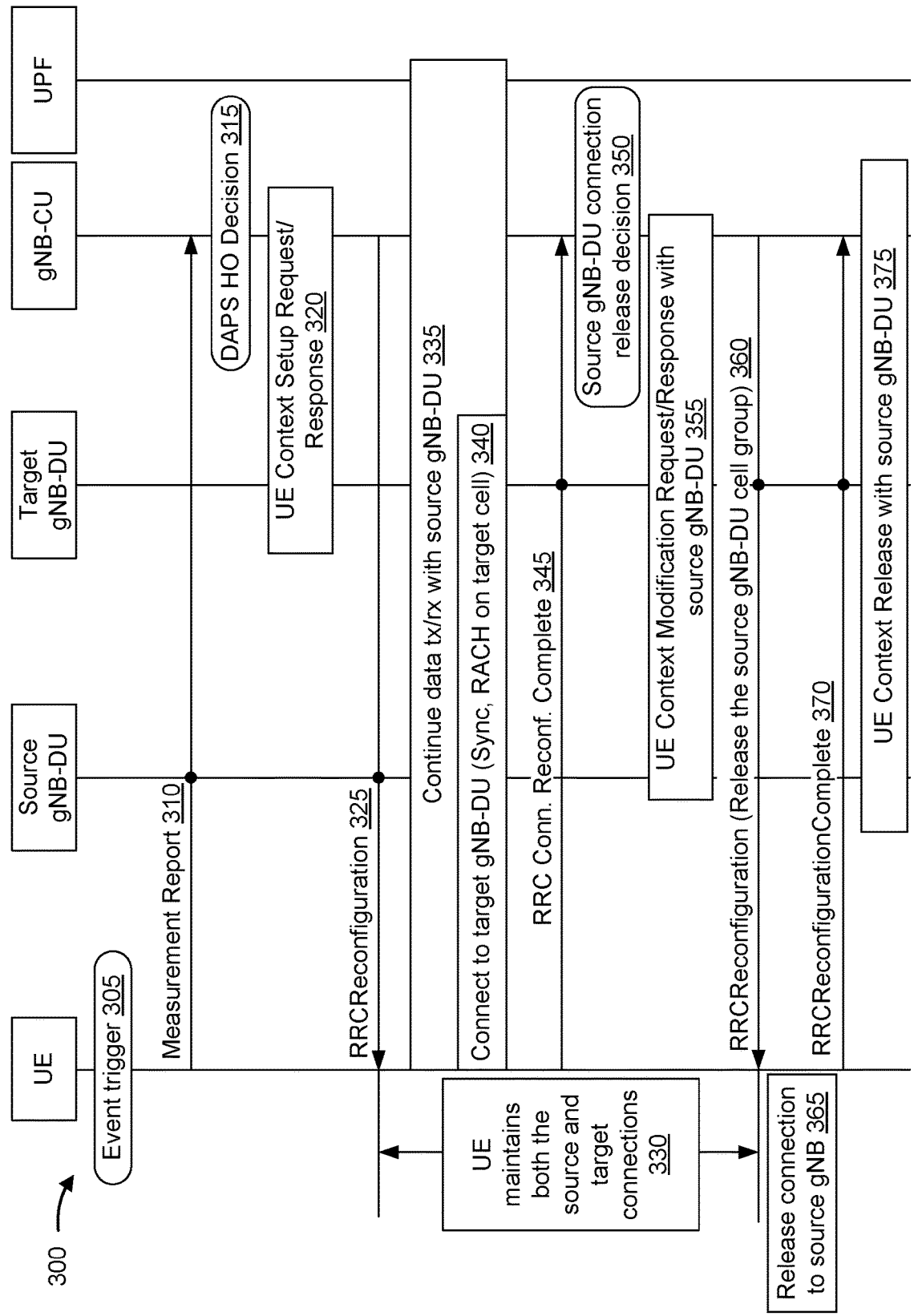
FIG. 3 is a diagram illustrating an example of a DAPS handover, in accordance with various aspects of the present disclosure.

FIG. 3 is a diagram illustrating an example 300 of a DAPS handover, in accordance with various aspects of the present disclosure. A source gNB-DU (such as BSs 110a-110d depicted and described in FIG. 1, or BS 110 depicted and described in FIG. 2) may provide a source cell for a UE (such as UEs 120a-120e depicted and described in FIG. 1, or UE 120 depicted and described in FIG. 2). The UE may be handed over from the source cell to a target cell provided by a target gNB-DU (such as BSs 110a-110d and BS 110). A gNB may include a central unit (CU) and/or a distributed unit (DU). A CU is a logical node that performs gNB functions such as transfer of user data, mobility control, radio access network (RAN) sharing, positioning, session management and/or other functions not allocated exclusively to the DU. The CU may control the operation of DUs over a front-haul interface. A DU may perform gNB functions that are allocated to the DU based at least in part on a functional split between the DU and the CU. For example, a DU may perform one or more of packet data convergence protocol (PDCP) functions, radio link control (RLC) functions, medium access control (MAC) functions, physical (PHY) layer functions, radio frequency (RF) functions, or a combination thereof. In some aspects, one or more of the above functions may be allocated to the CU and one or more of the above functions may be allocated to the DU based at least in part on the functional split.

As shown by reference number 305, the UE may detect an event trigger. For example, the event trigger may relate to a measurement threshold for triggering a handover from a source cell or source master cell group (MCG) to a target cell or target MCG. When the measurement threshold is satisfied, the UE may determine that the event trigger is detected.

As shown by reference number 310, the UE may transmit a measurement report based at least in part on detecting the event trigger. For example, the UE may transmit a measurement report to the gNB-CU via the source gNB-DU. The measurement report may identify neighbor cell measurements for one or more cells or cell groups.

As shown by reference number 315, the gNB-CU may determine that a DAPS based handover is to be performed based at least in part on the measurement report. For example, the gNB-CU may select the target gNB-DU based at least in part on a measurement identified by the measurement report.

As shown by reference number 320, the gNB-CU may transmit a UE context setup request to the target gNB-DU, and the target gNB-DU may provide a UE context setup response. The UE context setup request may indicate that the UE is to be handed over to the target gNB-DU. The target gNB-DU may set up a UE context for the UE based at least in part on the UE context setup request, and may provide a UE context setup response indicating that the UE context has been set up.

As shown by reference number 325, the gNB-CU may provide an RRC reconfiguration message to the UE. The RRC reconfiguration message shown by reference number 325 may reconfigure a cell group configuration of the UE and may indicate that the UE is to perform a DAPS handover from a source MCG (such as associated with the source gNB-DU) to the target MCG (such as associated with the target gNB-DU). In some aspects, the RRC reconfiguration message shown by reference number 325 may be referred to as a handover command.

As shown by reference number 330, the UE may maintain a connection to the source gNB and the target gNB during the DAPS based handover. For example, the UE may maintain respective RRC connections with the source gNB-DU and the target gNB-DU until an RRC reconfiguration message indicating to release the source MCG associated with the source gNB-DU is received. User plane interruption and handover latency may be reduced.

As shown by reference number 335, the UE may continue data transmission or reception with the source gNB-DU as the UE connects to the target gNB-DU, shown by reference number 340. For example, the UE may continue communication with the source gNB-DU as synchronization and a random access channel (RACH) procedure are performed for the target gNB-DU.

As shown by reference number 345, the UE may transmit an indication to the gNB-CU, via the target gNB-DU, that the RRC connection reconfiguration is complete. For example, the UE may transmit the indication based at least in part on successfully establishing a connection with the target gNB-DU. As shown by reference number 350, the gNB-CU may determine, based at least in part on the RRC reconfiguration complete message shown by reference number 345, that the connection with the source gNB-DU is to be released. Accordingly, as shown by reference number 355, the gNB-CU may provide, to the source gNB-DU, a UE context modification request to switch the UE's MCG from the source gNB-DU to the target gNB-DU. The source gNB-DU may provide a UE context modification response to the gNB-CU based at least in part on performing the UE context modification in accordance with the UE context modification request.

As shown by reference number 360, the gNB-CU may provide an RRC reconfiguration message to the UE. The RRC reconfiguration message may indicate that the UE is to release the source gNB-DU cell group (such as the source MCG). Accordingly, as shown by reference number 365, the UE may release the connection to the source gNB. In some aspects, a duration of the DAPS handover may be considered to be between the RRC reconfiguration message shown by reference number 325 and the UE context release shown by reference number 375 of FIG. 3. Some techniques and apparatuses described herein provide rules for BWP switching before, during, and/or after the duration of the DAPS handover.

As shown by reference number 370, the UE may provide an RRC reconfiguration complete message to the gNB-CU via the target gNB-DU. The RRC reconfiguration complete message may indicate that the UE has established the connection with the target gNB-DU. Accordingly, as shown by reference number 375, the gNB-CU may release a UE context with the source gNB-DU based at least in part on receiving the RRC reconfiguration complete message from the UE. Thus, the UE, the source gNB, and the target gNB may perform a DAPS based handover. In some aspects, a DAPS based handover may be referred to herein as a DAPS handover.

As indicated above, FIG. 3 is provided as an example. Other examples may differ from what is described with regard to FIG. 3.

Figure 4:
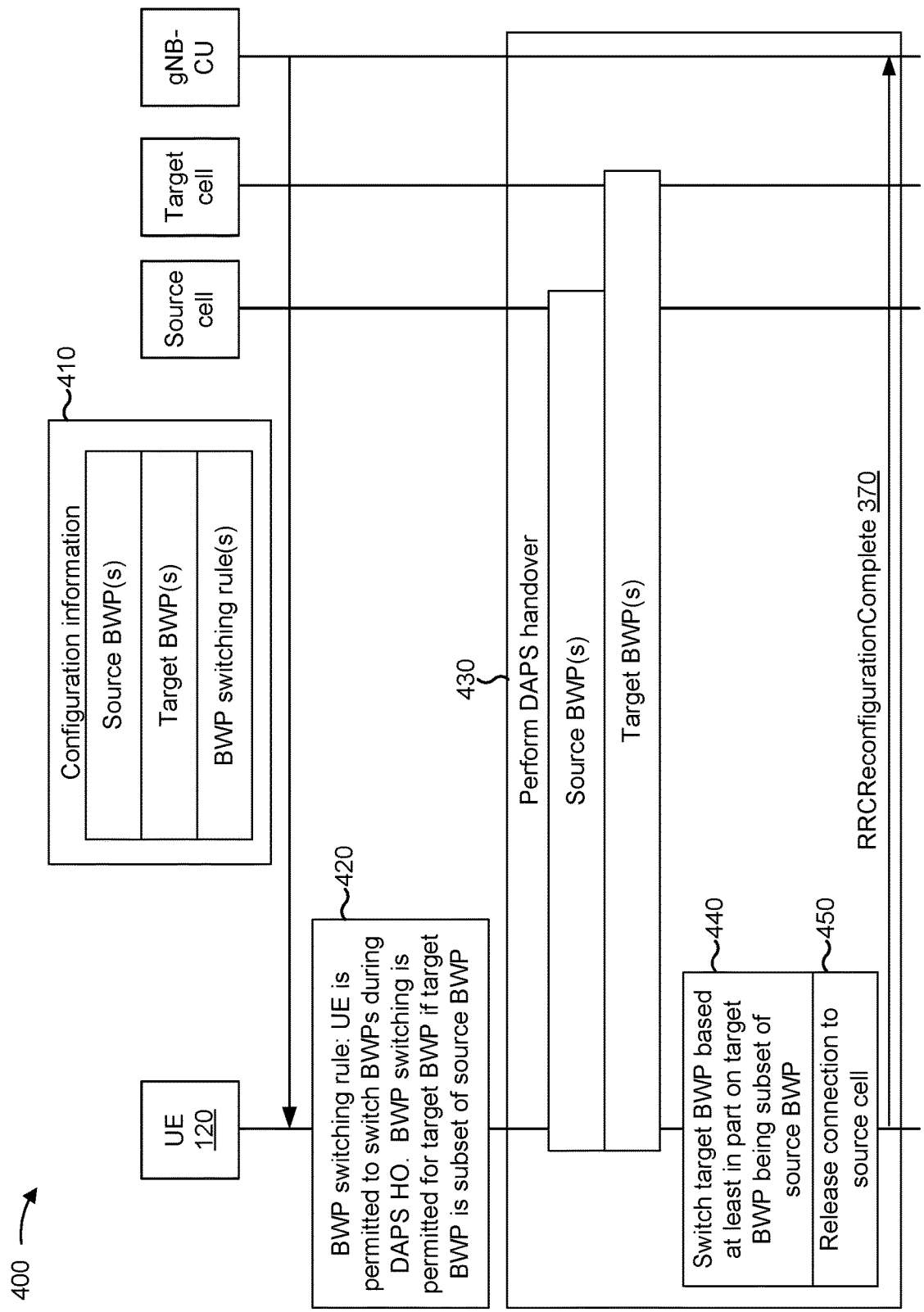
FIG. 4 is a diagram illustrating an example of BWP switching in association with a DAPS handover, in accordance with various aspects of the present disclosure.

FIG. 4 is a diagram illustrating an example 400 of BWP switching in association with a DAPS handover, in accordance with various aspects of the present disclosure. As shown, example 400 includes a UE 120, a gNB-CU (e.g., the gNB-CU of FIG. 3, BS 110), a source cell, and a target cell. The source cell may be provided by or associated with a source gNB-DU (e.g., the source gNB-DU of FIG. 3, BS 110), and the target cell may be provided by or associated with a target gNB-DU (e.g., the target gNB-DU of FIG. 3, BS 110). In some aspects, the source cell and/or the target cell may be associated with the gNB-CU. For example, the source cell and/or the target cell may be provided by a gNB-DU associated with the gNB-CU. In some aspects, neither the source cell nor the target cell may be associated with the gNB-CU. In example 400, the source cell is a cell to which the UE 120 is connected before performing a DAPS handover, and the target cell is a cell to which the UE is connected after performing the DAPS handover, as described in more detail below.

As shown in FIG. 4, and by reference number 410, the gNB-CU may provide configuration information to the UE 120. In some aspects, the gNB-CU may provide the configuration information via the source cell. In some aspects, as shown, the configuration information may configure one or more source BWPs and/or one or more target BWPs. A source BWP is a BWP used by the UE 120 to communicate via the source cell, and a target BWP is a BWP used by the UE 120 to communicate via the target cell. A source BWP can include one or more of an uplink BWP or a downlink BWP. A target BWP can include one or more of an uplink BWP or a downlink BWP. In some aspects, the configuration information may configure a BWP for the UE 120 (e.g., a dedicated BWP configured using dedicated signaling and/or an initial BWP configured via system information). In some aspects, the configuration information may activate a configured BWP. The configuration information may include system information, RRC signaling, MAC signaling, DCI, or a combination thereof.

While example 400 shows the configuration information as being received prior to the DAPS handover, in some aspects, at least part of the configuration may be received during the DAPS handover. For example, the gNB-CU may activate a BWP (e.g., a source BWP or a target BWP) during the DAPS handover, thereby triggering the UE 120 to switch BWPs during the handover in accordance with a BWP switching rule, as described in more detail below.

In some aspects, the configuration information (e.g., and/or the gNB-CU) may configure a BWP switching configuration. A BWP switching configuration may indicate information regarding BWP switching. For example, the BWP switching configuration may indicate information regarding BWP switching in association with a DAPS handover. In some aspects, the BWP switching configuration may indicate a set of source BWPs, a set of target BWPs, an active source BWP, an active target BWP, a time at which the UE 120 is to switch an active source BWP or an active target BWP, a BWP switching rule (described in more detail below), and/or the like.

In some aspects, the configuration information may indicate a BWP switching rule. A BWP switching rule may indicate whether a UE 120 can perform a BWP switch during a DAPS handover. For example, a BWP switching rule may indicate whether a UE 120 is permitted to perform a BWP switch during a handover. The BWP switching rule may relate to at least one of a source BWP or a target BWP of the UE 120. In some aspects, the UE 120 may be preconfigured with the BWP switching rule. Various examples of BWP switching rules are provided below. As used herein, a time "during a DAPS handover" can refer to a time that is between the event trigger 305 and the UE context release shown by reference number 375 of FIG. 3. In some aspects, a time "during a DAPS handover" can refer to a time that is between the RRC reconfiguration message shown by reference number 325 and the connection release of the source gNB-DU shown by reference number 365 of FIG. 3. In other words, the BWP switching rule may apply when the UE is associated with both a source connection on the source cell and a target connection on the target cell.

In some aspects, the BWP switching rule indicates that the UE is not permitted to switch a source BWP during the DAPS handover. For example, the BWP switching rule may indicate that source BWP switching (including at least one of an uplink BWP or a downlink BWP) during the DAPS handover is not allowed. As used herein, "source BWP switching" refers to changing from a first active BWP on the source cell to a second active BWP on the source cell. In some aspects, the BWP switching rule indicates that the UE is not permitted to switch a target BWP during the DAPS handover. For example, the BWP switching rule may indicate that target BWP switching (including at least one of an uplink BWP or a downlink BWP) is not allowed. As used herein, "target BWP switching" refers to changing from a first active BWP on the target cell to a second active BWP on the target cell.

In some aspects, the BWP switching rule indicates that the UE is permitted to switch a source BWP during the DAPS handover. For example, the BWP switching rule may indicate that source BWP switching (including at least one of an uplink BWP or a downlink BWP) is enabled. Additionally, or alternatively, the BWP switching rule may indicate that the UE is permitted to switch a target BWP during the DAPS handover. For example, the BWP switching rule may indicate that target BWP switching (including at least one of an uplink BWP or a downlink BWP) is enabled.

In some aspects, the BWP switching rule indicates that only one of a downlink BWP or an uplink BWP can be switched during the DAPS handover. For example, the BWP switching rule may indicate that only one of a BWP associated with a source cell or a BWP associated with a target cell can be switched during the DAPS handover. For example, for a cell (e.g., a source cell or a target cell), a downlink BWP may be allowed to be switched and an uplink BWP may not be allowed to be switched, or vice versa. As another example, a source downlink BWP may be allowed to be switched whereas a target downlink BWP may not be allowed to be switched, or vice versa.

In some aspects, the BWP switching rule may indicate that BWP switching is permitted for a target BWP if the target BWP is a subset of a source BWP. For example, for an intra-frequency DAPS handover, the UE 120 may expect that an active downlink bandwidth part of a target cell is confined within an active downlink bandwidth part of a source cell. As another example, for an intra-frequency DAPS handover, the UE 120 may expect that an active uplink bandwidth part of a target cell is confined within an active uplink bandwidth part of a source cell. Additionally, or alternatively, the BWP switching rule may indicate that BWP switching is permitted for a source BWP if the source BWP is a subset of a target BWP. A first BWP is a subset of a second BWP if a bandwidth of the first BWP is included within or is coextensive with a bandwidth of the second BWP. By mandating that the first BWP be within a bandwidth of the second BWP, the UE can use a BWP capability of the second BWP to process signals and channels of the first cell and the second cell during the DAPS handover.

In some aspects, the BWP switching rule may indicate that the first BWP is to be a subset of the second BWP before the BWP switch is performed. For example, in a case of an initial first BWP and a switched first BWP, the BWP switching rule may indicate that the initial first BWP is to be a subset of the second BWP before the BWP switch is performed. In some aspects, the BWP switching rule may indicate that the first BWP is to be a subset of the second BWP after the BWP switch is performed. For example, in a case of an initial first BWP and a switched first BWP, the BWP switching rule may indicate that the switched first BWP is to be a subset of the second BWP after the BWP switch is performed.

Figure 5:
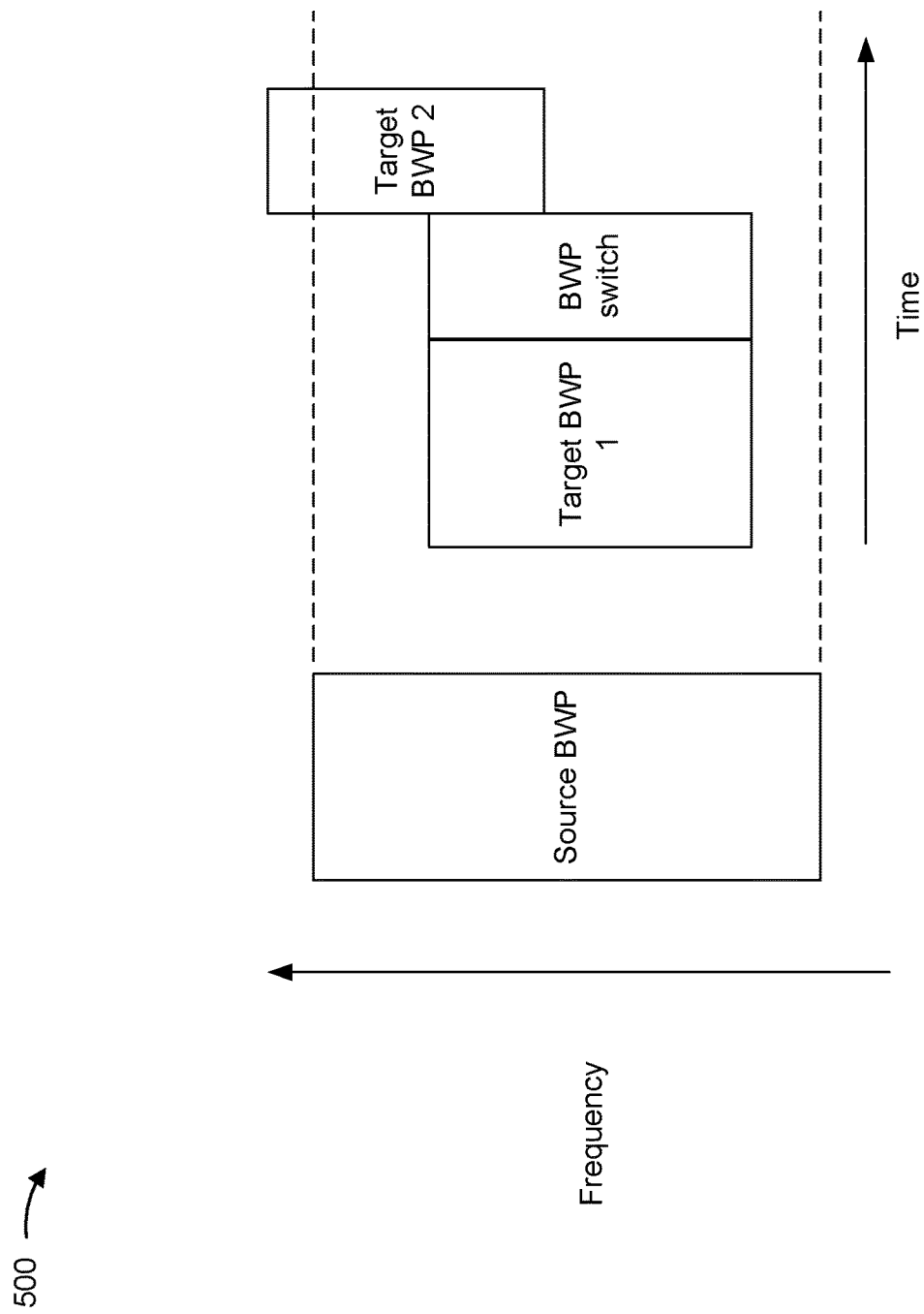
FIG. 5 is a diagram illustrating an example of a target BWP that is a subset of a source BWP, in accordance with various aspects of the present disclosure.

FIG. 5 is a diagram illustrating an example 500 of a target BWP that is a subset of a source BWP, in accordance with various aspects of the present disclosure. As shown, example 500 includes a source BWP, a first target BWP (e.g., Target BWP 1), and a second target BWP (e.g., Target BWP 2). As shown, in FIG. 5, the vertical axis represents frequency. Furthermore, with regard to the first target BWP and the second target BWP, the horizontal axis represents time. For example, the UE 120 may switch from the first target BWP to the second target BWP. As shown, the first target BWP is within a bandwidth of the source BWP (e.g., is a subset of the source BWP) and the second target BWP is not within the bandwidth of the source BWP.

If the BWP switching rule indicates that the UE 120 is permitted to switch a target BWP if the target BWP is a subset of the source BWP before the BWP switch is performed, then the UE 120 may be permitted to switch to the first target BWP, since the first target BWP is within the source BWP. If the BWP switching rule indicates that the UE 120 is permitted to switch a target BWP if the target BWP is a subset of the source BWP after the BWP switch is performed, then the UE 120 may not be permitted to switch to the second target BWP, since the second target BWP is not within the source BWP. In some aspects, the BWP switching rule may indicate, for an intra-frequency DAPS handover, that the UE 120 expects that an active bandwidth part of a target cell is confined within an active bandwidth part of a source cell. Thus, the UE 120 may determine that the first target BWP can be used or switched to, whereas the second target BWP cannot be used or switched to.

Returning to FIG. 4, in some aspects, the BWP switching rule may be based at least in part on whether the DAPS handover is an intra-frequency handover. For example, the BWP switching rule may indicate that BWP switching is not permitted on a communication link for an intra-frequency handover when the UE 120 is associated with a single communication chain for the communication link, thus reducing interruption on the communication link. As another example, the BWP switching rule may indicate that BWP switching is permitted on a communication link for an intra-frequency handover when the UE is associated with multiple communication chains for the communication link, thus improving flexibility of BWP switching.

In some aspects, the BWP switching rule may indicate that BWP switching is permitted for a first link direction and not for a second link direction. For example, the BWP switching rule may indicate that BWP switching is permitted for an uplink BWP and not for a downlink BWP. In some aspects, the BWP switching rule may indicate that BWP switching is permitted for a source BWP and not for a target BWP. In some aspects, the BWP switching rule may indicate that BWP switching is permitted for a target BWP and not for a source BWP.

As shown by reference number 420, in example 400, the BWP switching rule indicates that the UE 120 is permitted to switch BWPs during the DAPS handover, and that BWP switching is permitted for a target BWP if the target BWP is a subset of the source BWP. For example, the rule may indicate that BWP switching is permitted for the target BWP if the target BWP is a subset of the source BWP before the BWP switch, or that BWP switching is permitted for the target BWP if the target BWP is a subset of the source BWP after the BWP switch.

As shown by reference number 430, the UE 120 and the gNB-CU may perform the DAPS handover. For example, the UE 120 and the gNB-CU may perform one or more of the operations described with regard to FIG. 3. As further shown, the UE 120 may be associated with one or more source BWPs and one or more target BWPs during the DAPS handover. For example, the one or more source BWPs and the one or more target BWPs may be based at least in part on the configuration information shown by reference number 410.

In some aspects, if downlink BWPs in the source cell (e.g., a downlink source BWP) and the target cell (e.g., a downlink target BWP) are not the same (e.g., are not fully overlapped), then the DAPS handover may use a downlink carrier aggregation (CA) framework (described in more detail below) or a multi-TRP framework. In some aspects, if the uplink BWPs in the source cell and the target cell are not the same (e.g., are not fully overlapped), then the DAPS handover may use an uplink CA framework or a multi-TRP framework. As used herein, in the context of BWPs, "fully overlapped" refers to two or more BWPs with the same center frequency and the same bandwidth.

In some aspects, if the downlink BWPs and the uplink BWPs in the source cell and the target cell are not the same (e.g., the downlink BWPs are not fully overlapped with each other and the uplink BWPs are not fully overlapped with each other), then the DAPS handover may use a downlink CA framework or a multi-TRP framework, and an uplink CA framework or a multi-TRP framework.

In some aspects, the DAPS handover may be an intra-frequency handover, meaning that the source cell and the target cell may be associated with a same center frequency and/or a same bandwidth. In some aspects, for an intra-frequency handover, the configuration information may configure the same active BWP for source and target cells. For example, the configuration information may configure the same active BWP for source and target cells based at least in part on the UE having a single transmit chain (e.g., for an uplink BWP) or a single receive chain (e.g., for a downlink BWP). As another example, for intra-frequency handover, the BWP switching rule may indicate that the BWP may not be switched when the UE 120 has a single transmit chain and/or a single receive chain, and may indicate that the BWP may be switched when the UE has multiple transmit chains and/or multiple receive chains. If the source BWP and the target BWP are partially overlapped, then the UE 120 may use an inter-frequency handover framework for the DAPS handover.

In some aspects, the DAPS handover may be an inter-frequency handover, meaning that the source cell and the target cell may be associated with different center frequencies and/or different bandwidths. For an inter-frequency handover, the UE 120 and the gNB-CU may use a CA framework or a multi-TRP framework for handling different BWPs in source and target cells. In some aspects, the BWP switching rule may indicate that BWP switching is enabled for inter-frequency handover and not for intra-frequency handover.

As shown by reference number 440, the UE 120 may perform BWP switching based at least in part on the BWP switching rule. For example, the UE 120 may switch a target BWP associated with the target cell based at least in part on the target BWP being a subset of the source BWP (e.g., before the BWP switch or after the BWP switch, as described in more detail elsewhere herein).

As shown by reference number 450, the UE 120 may release a connection to the source cell. As shown by reference number 370, the UE 120 may transmit an RRC reconfiguration complete message to the gNB-CU (e.g., via the target cell) indicating that the DAPS handover is complete, as described in more detail in connection with FIG. 3.

As indicated above, FIGS. 4 and 5 are provided as one or more examples. Other examples may differ from what is described with regard to FIGS. 4 and 5.

Figure 6:
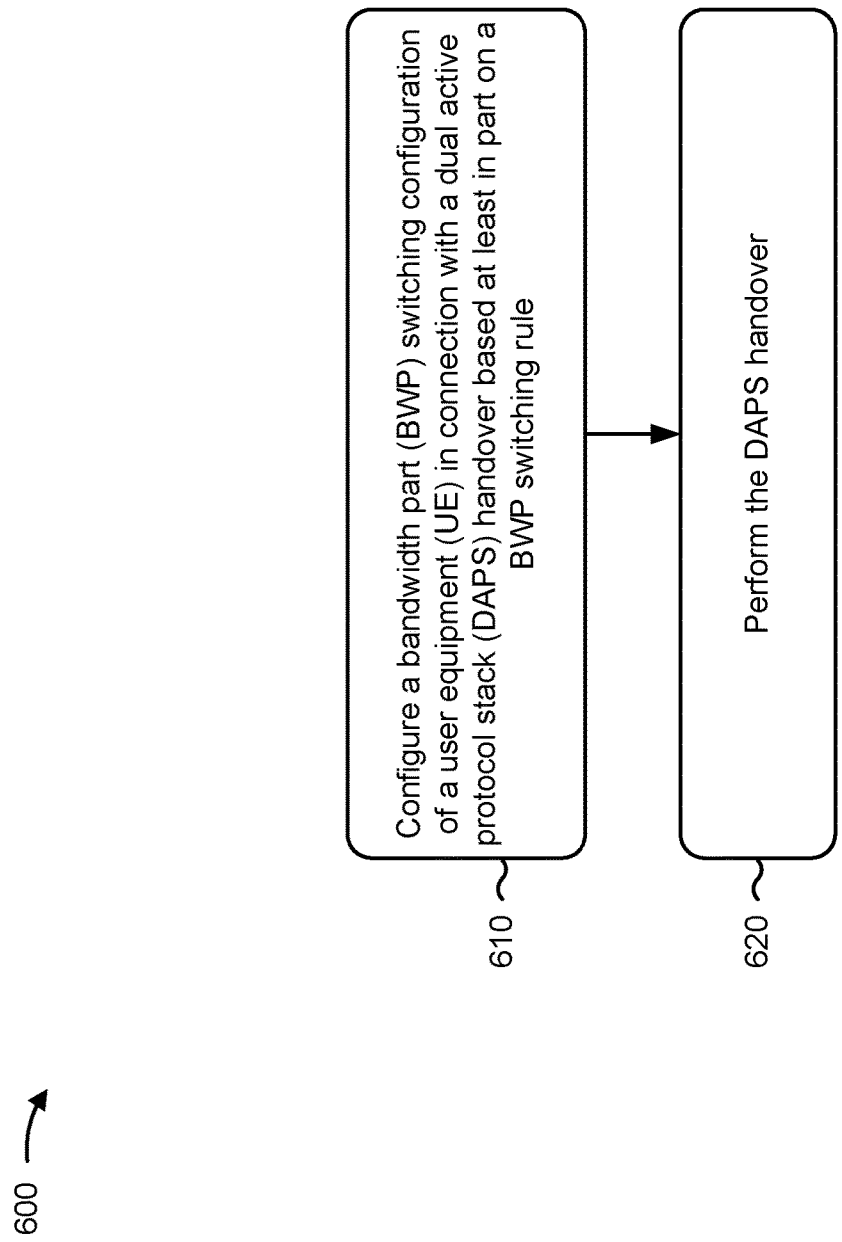
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110, a gNB-CU, a gNB-DU, and/or the like) performs operations associated with BWP switching for a DAPS handover.

As shown in FIG. 6, in some aspects, process 600 may include configuring a BWP switching configuration of a UE in connection with a DAPS handover based at least in part on a BWP switching rule (block 610). For example, the base station (e.g., using antenna 234, DEMOD 232, MIMO detector 236, receive processor 238, controller/processor 240, and/or the like) may configure a BWP switching configuration of a UE in connection with a DAPS handover based at least in part on a BWP switching rule, as described above. In some aspects, the base station may switch the UE from a first BWP to a second BWP in accordance with the BWP switching rule, or may determine that the UE cannot be switched from a first BWP to the second BWP in accordance with the BWP switching rule. In some aspects, configuring a BWP switching configuration of the UE may refer to providing DCI to the UE that causes the UE to switch an active BWP, or refraining from switching the active BWP, in accordance with the BWP switching rule. In other words, configuring the BWP switching configuration may not refer to performing an RRC configuration or a similar type of configuration for the UE, and may refer to the act of switching the active BWP.

As further shown in FIG. 6, in some aspects, process 600 may include performing the DAPS handover (block 620). For example, the base station (e.g., using antenna 234, DEMOD 232, MIMO detector 236, receive processor 238, controller/processor 240, and/or the like) may perform the DAPS handover, as described above. The base station may provide a source cell of the DAPS handover and/or a target cell of the DAPS handover.

Process 600 may include additional aspects, such as any single aspect or any combination of aspects described below and/or in connection with one or more other processes described elsewhere herein.

In a first aspect, the BWP switching rule indicates that the UE is not permitted to switch a source BWP during the DAPS handover. For example, the BWP switching rule may indicate that source BWP switching (including at least one of an uplink BWP or a downlink BWP) is not allowed.

In a second aspect, alone or in combination with the first aspect, the BWP switching rule indicates that the UE is not permitted to switch a target BWP during the DAPS handover. For example, the BWP switching rule may indicate that target BWP switching (including at least one of an uplink BWP or a downlink BWP) is not allowed.

In a third aspect, alone or in combination with one or more of the first and second aspects, the BWP switching rule indicates that the UE is permitted to switch a source BWP during the DAPS handover. For example, the BWP switching rule may indicate that source BWP switching (including at least one of an uplink BWP or a downlink BWP) is enabled.

In a fourth aspect, alone or in combination with one or more of the first through third aspects, the BWP switching rule indicates that the UE is permitted to switch a target BWP during the DAPS handover. For example, the BWP switching rule may indicate that target BWP switching (including at least one of an uplink BWP or a downlink BWP) is enabled.

In a fifth aspect, alone or in combination with one or more of the first through fourth aspects, configuring the BWP switching configuration further comprises configuring the UE to switch at least one of a source BWP or a target BWP during the DAPS handover. This may include switching the UE's source BWP and/or target BWP (e.g., using DCI).

In a sixth aspect, alone or in combination with one or more of the first through fifth aspects, the BWP switching rule indicates that only one of a downlink BWP or an uplink BWP can be switched during the DAPS handover. In a seventh aspect, alone or in combination with one or more of the first through sixth aspects, the BWP switching rule indicates that only one of a BWP associated with a source cell or a BWP associated with a target cell can be switched during the DAPS handover. For example, for a cell (e.g., a source cell or a target cell), a downlink BWP may be allowed to be switched but an uplink BWP may not be allowed to be switched, or vice versa. As another example, a source downlink BWP may be allowed to be switched and a target downlink BWP may not be allowed to be switched, or vice versa.

In an eighth aspect, alone or in combination with one or more of the first through seventh aspects, the BWP associated with the source cell and the BWP associated with the target cell are one of downlink BWPs or uplink BWPs.

In a ninth aspect, alone or in combination with one or more of the first through eighth aspects, the BWP switching rule indicates that BWP switching is permitted for a target BWP if the target BWP is a subset of a source BWP before the BWP switching is performed. In a tenth aspect, alone or in combination with one or more of the first through ninth aspects, the BWP switching rule indicates that BWP switching is permitted for a target BWP if the target BWP is a subset of a source BWP after the BWP switching is performed. In an eleventh aspect, alone or in combination with one or more of the first through tenth aspects, the BWP switching rule indicates that BWP switching is permitted for a source BWP if the source BWP is a subset of a target BWP before the BWP switching is performed. In a twelfth aspect, alone or in combination with one or more of the first through eleventh aspects, the BWP switching rule indicates that BWP switching is permitted for a source BWP if the source BWP is a subset of a target BWP after the BWP switching is performed. A first BWP may be a subset of a second BWP if a bandwidth of the first BWP is included within or coextensive with a bandwidth of the second BWP. For example, the first BWP may be associated with a first cell (e.g., a source cell or a target cell) and the second BWP may be associated with a second cell (e.g., a target cell or a source cell). In this case, the UE can use a BWP capability of the second BWP to process signals and channels of the first cell and the second cell during the DAPS handover.

In a thirteenth aspect, alone or in combination with one or more of the first through twelfth aspects, the DAPS handover is an intra-frequency handover. Additionally, or alternatively, the UE may be associated with a single communication chain, and configuring the BWP switching configuration may further include configuring a same active BWP to be used for a source cell and for a target cell. In a fourteenth aspect, alone or in combination with one or more of the first through thirteenth aspects, the single communication chain is an uplink communication chain and the same active BWP is an uplink BWP. In a fifteenth aspect, alone or in combination with one or more of the first through fourteenth aspects, the single communication chain is a downlink communication chain and the same active BWP is a downlink BWP. For example, configuring the same active BWP for the source cell and the target cell may be permitted at least for the case when the UE has a single transmit chain (for an uplink BWP) and/or a single receive chain (for a downlink BWP). This enables a UE with a single communication chain to perform contemporaneous communication on the source cell and the target cell. If the source BWP and the target BWP are partially overlapped, then for the DAPS handover, UE may use an inter-frequency handover framework (e.g., a carrier aggregation or multi-TRP framework, described below).

In a sixteenth aspect, alone or in combination with one or more of the first through fifteenth aspects, when the DAPS handover is an inter-frequency handover, configuring the BWP switching configuration further comprises: configuring a source BWP of the UE as a first component carrier; and configuring a target BWP of the UE as a second component carrier. In some aspects, the UE may configure a source BWP as a first component carrier and a target BWP as a second component carrier. This may be referred to as a carrier aggregation (CA) framework.

In a seventeenth aspect, alone or in combination with one or more of the first through sixteenth aspects, when the DAPS handover is an inter-frequency handover, configuring the BWP switching configuration further comprises: configuring a source BWP of the UE as a first leg of a multi-transmit/receive point (multi-TRP) communication, and configuring a target BWP of the UE as a second leg of the multi-TRP communication. This may be referred to as a multi-TRP framework.

In an eighteenth aspect, alone or in combination with one or more of the first through seventeenth aspects, the BWP switching rule indicates that BWP switching is not permitted on a communication link for an intra-frequency handover when the UE is associated with a single communication chain for the communication link.

In a nineteenth aspect, alone or in combination with one or more of the first through eighteenth aspects, the BWP switching rule indicates that BWP switching is permitted on a communication link for an intra-frequency handover when the UE is associated with multiple communication chains for the communication link.

In a twentieth aspect, alone or in combination with one or more of the first through nineteenth aspects, the BWP switching rule indicates BWP switching is permitted for a source BWP if the source BWP contains a target BWP. In some aspects, the source BWP contains a target BWP if the target BWP is a subset of the source BWP.

In a twenty-first aspect, alone or in combination with one or more of the first through twentieth aspects, the BWP switching rule indicates BWP switching is permitted for a source BWP and a target BWP if the source BWP contains a target BWP.

In some aspects, if the downlink BWPs in the source cell and the target cell are not the same (e.g., are not fully overlapped), then the DAPS handover may use a downlink CA framework or a multi-TRP framework.

In some aspects, if the uplink BWPs in the source cell and the target cell are not the same (e.g., are not fully overlapped), then the DAPS handover may use an uplink CA framework or a multi-TRP framework.

In some aspects, if the downlink BWPs and the uplink BWPs in the source cell and the target cell are not the same (e.g., the downlink BWPs are not fully overlapped with each other and the uplink BWPs are not fully overlapped with each other), then the DAPS handover may use a downlink CA framework or a multi-TRP framework and an uplink CA framework or a multi-TRP framework.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
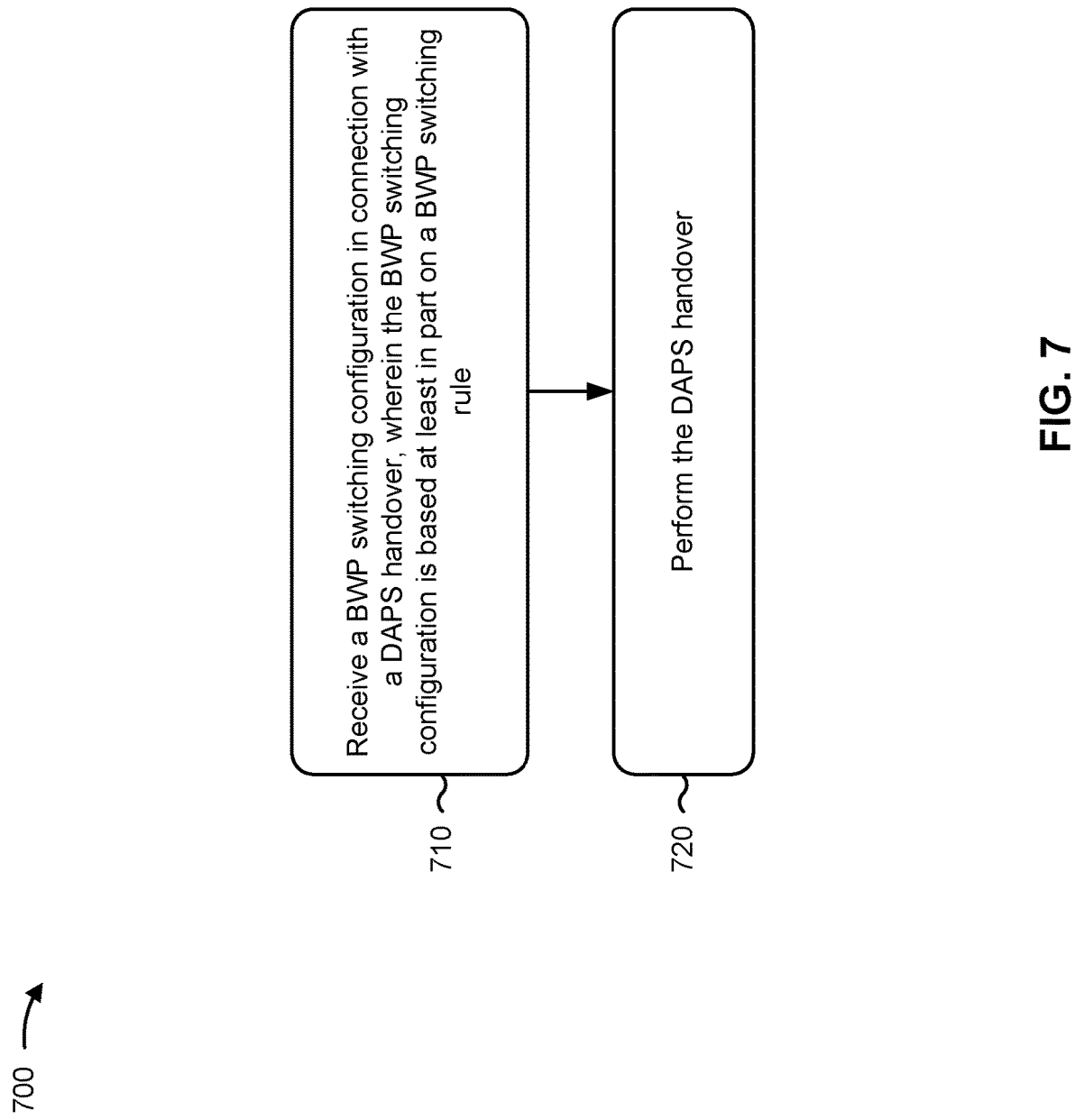
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with BWP switching for a DAPS handover.

As shown in FIG. 7, in some aspects, process 700 may include receiving a BWP switching configuration in connection with a DAPS handover, wherein the BWP switching configuration is based at least in part on a BWP switching rule (block 710). For example, the UE (e.g., using antenna 252, DEMOD 254, MIMO detector 256, receive processor 258, controller/processor 280, and/or the like) may receive a BWP switching configuration in connection with a DAPS handover, as described above. In some aspects, the BWP switching configuration is based at least in part on a BWP switching rule.

As further shown in FIG. 7, in some aspects, process 700 may include performing the DAPS handover (block 720). For example, the UE (e.g., using antenna 252, DEMOD 254, MIMO detector 256, receive processor 258, controller/processor 280, and/or the like) may perform the DAPS handover, as described above.

Process 700 may include additional aspects, such as any single aspect or any combination of aspects described below and/or in connection with one or more other processes described elsewhere herein.

In a first aspect, the BWP switching rule indicates that the UE is not permitted to switch a source BWP during the DAPS handover.

In a second aspect, alone or in combination with the first aspect, the BWP switching rule indicates that the UE is not permitted to switch a target BWP during the DAPS handover. When the BWP switching rule indicates that the UE is not permitted to switch a BWP, then the UE may assume that the BWP will not be switched, may not expect the BWP to be switched, may determine an error if the BWP is switched, and/or the like.

In a third aspect, alone or in combination with one or more of the first and second aspects, the BWP switching rule indicates that the UE is permitted to switch a source BWP during the DAPS handover.

In a fourth aspect, alone or in combination with one or more of the first through third aspects, the BWP switching rule indicates that the UE is permitted to switch a target BWP during the DAPS handover.

In a fifth aspect, alone or in combination with one or more of the first through fourth aspects, the BWP switching configuration configures the UE to switch at least one of a source BWP or a target BWP during the DAPS handover.

In a sixth aspect, alone or in combination with one or more of the first through fifth aspects, the BWP switching rule indicates that only one of a downlink BWP or an uplink BWP can be switched during the DAPS handover.

In a seventh aspect, alone or in combination with one or more of the first through sixth aspects, the BWP switching rule indicates that only one of a BWP associated with a source cell or a BWP associated with a target cell can be switched during the DAPS handover.

In an eighth aspect, alone or in combination with one or more of the first through seventh aspects, the BWP associated with the source cell and the BWP associated with the target cell are one of: downlink BWPs, or uplink BWPs.

In a ninth aspect, alone or in combination with one or more of the first through eighth aspects, the BWP switching rule indicates BWP switching is permitted for a target BWP if the target BWP is a subset of a source BWP before the BWP switching is performed.

In a tenth aspect, alone or in combination with one or more of the first through ninth aspects, the BWP switching rule indicates that BWP switching is permitted for a target BWP if the target BWP is a subset of a source BWP after the BWP switching is performed.

In an eleventh aspect, alone or in combination with one or more of the first through tenth aspects, the BWP switching rule indicates BWP switching is permitted for a source BWP if the source BWP is a subset of a target BWP before the BWP switching is performed.

In a twelfth aspect, alone or in combination with one or more of the first through eleventh aspects, the BWP switching rule indicates that BWP switching is permitted for a source BWP if the source BWP is a subset of a target BWP after the BWP switching is performed.

In a thirteenth aspect, alone or in combination with one or more of the first through twelfth aspects, when the DAPS handover is an inter-frequency handover and the UE is associated with a single communication chain, the BWP switching configuration configures a same active BWP to be used for a source cell and for a target cell.

In a fourteenth aspect, alone or in combination with one or more of the first through thirteenth aspects, the single communication chain is an uplink communication chain and the same active BWP is an uplink BWP.

In a fifteenth aspect, alone or in combination with one or more of the first through fourteenth aspects, the single communication chain is a downlink communication chain and the same active BWP is a downlink BWP.

In a sixteenth aspect, alone or in combination with one or more of the first through fifteenth aspects, when the DAPS handover is an inter-frequency handover, the BWP switching configuration configures a source BWP of the UE as a first component carrier and a target BWP of the UE as a second component carrier.

In a seventeenth aspect, alone or in combination with one or more of the first through sixteenth aspects, when the DAPS handover is an inter-frequency handover, the BWP switching configuration configures a source BWP of the UE as a first leg of a multi-TRP communication and a target BWP of the UE as a second leg of the multi-TRP communication.

In an eighteenth aspect, alone or in combination with one or more of the first through seventeenth aspects, the BWP switching rule indicates that BWP switching is not permitted on a communication link for an intra-frequency handover when the UE is associated with a single communication chain for the communication link.

In a nineteenth aspect, alone or in combination with one or more of the first through eighteenth aspects, the BWP switching rule indicates that BWP switching is permitted on a communication link for an intra-frequency handover when the UE is associated with multiple communication chains for the communication link.

In a twentieth aspect, alone or in combination with one or more of the first through nineteenth aspects, when the DAPS handover is an intra-frequency handover and when the source BWP and the target BWP are not fully overlapped, the UE configures a source BWP of the UE as a first component carrier and a target BWP of the UE as a second component carrier.

In a twenty-first aspect, alone or in combination with one or more of the first through twentieth aspects, the BWP switching rule indicates BWP switching is permitted for a source BWP if the source BWP contains a target BWP. In some aspects, the source BWP contains a target BWP if the target BWP is a subset of the source BWP.

In a twenty-second aspect, alone or in combination with one or more of the first through twenty-first aspects, the BWP switching rule indicates BWP switching is permitted for a source BWP and a target BWP if the source BWP contains a target BWP.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
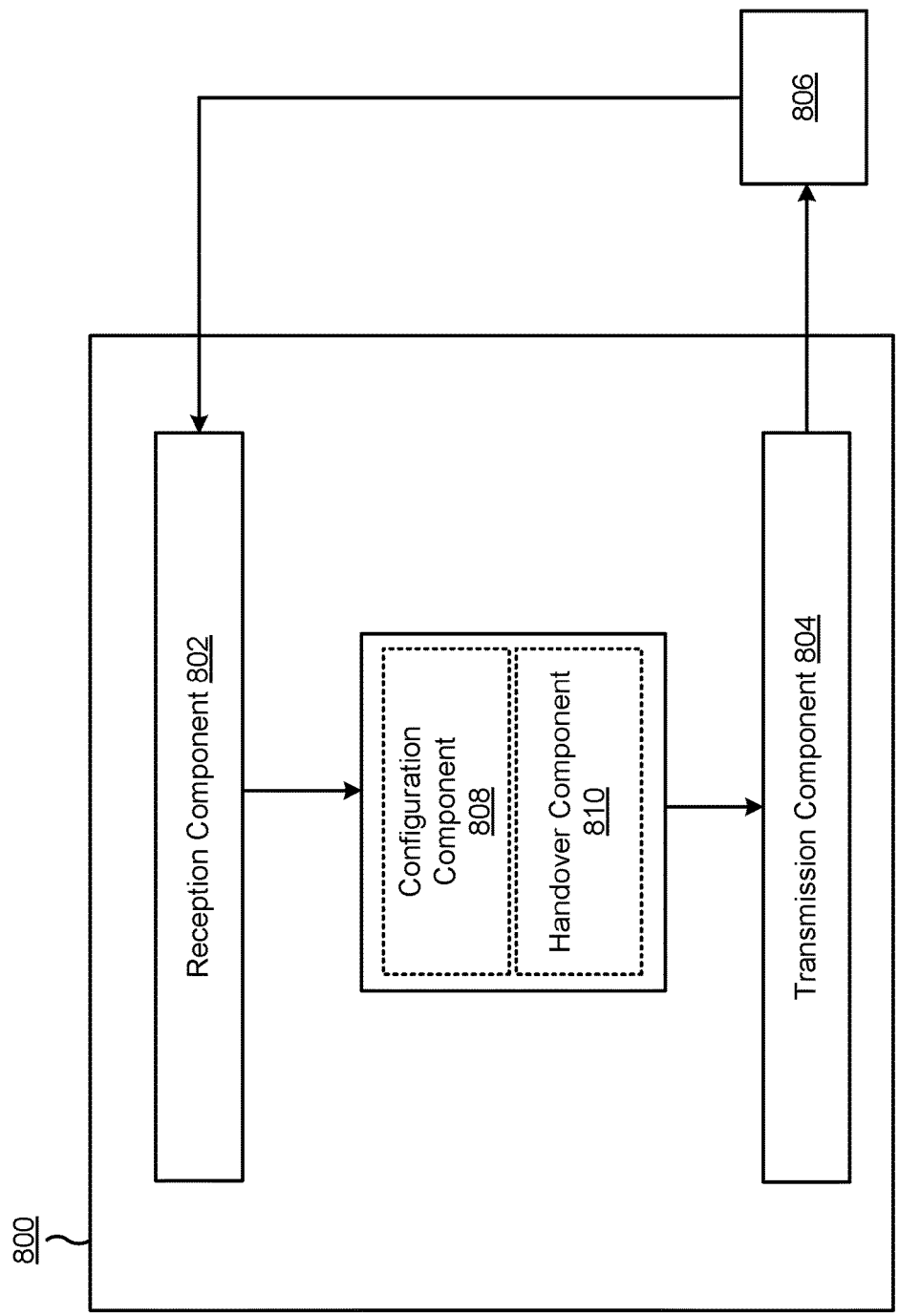
FIG. 8 is a block diagram of an example apparatus for wireless communication, in accordance with various aspects of the present disclosure.

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a configuration component 808 or a handover component 810, among other examples.

In some aspects, the apparatus 800 may be configured to perform one or more operations described herein in connection with FIG. 3-5. Additionally or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be collocated with the reception component 802 in a transceiver.

The configuration component 808 may configure a BWP switching configuration of a UE in connection with a DAPS handover based at least in part on a BWP switching rule. In some aspects, the configuration component 808 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The handover component 810 may perform the DAPS handover. In some aspects, the handover component 810 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

In some aspects, the configuration component 808 may configure a same active BWP to be used for a source cell and for a target cell. In some aspects, the configuration component 808 may configure a source BWP of the UE as a first component carrier. In some aspects, the configuration component 808 may configure a target BWP of the UE as a second component carrier. In some aspects, the configuration component 808 may configure a source BWP of the UE as a first leg of a multi-TRP communication. In some aspects, the configuration component 808 may configure a target BWP of the UE as a second leg of the multi-TRP communication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
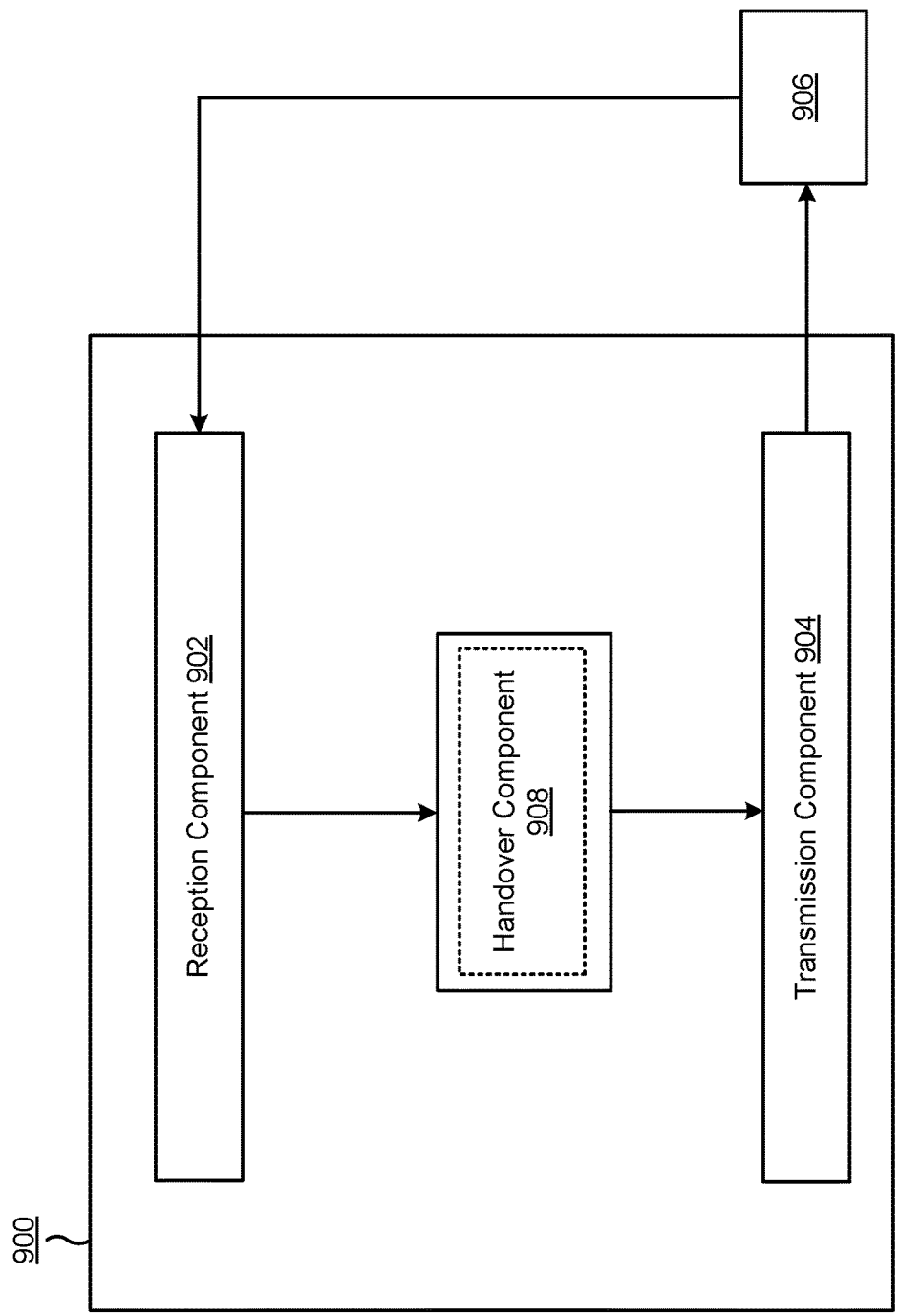
FIG. 9 is a block diagram of an example apparatus for wireless communication, in accordance with various aspects of the present disclosure.

FIG. 9 is a block diagram of an example apparatus 900 for wireless communication, in accordance with various aspects of the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a handover component 908, among other examples.

In some aspects, the apparatus 900 may be configured to perform one or more operations described herein in connection with FIG. 3-5. Additionally or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The reception component 902 may receive a BWP switching configuration in connection with a DAPS handover, wherein the BWP switching configuration is based at least in part on a BWP switching rule. The handover component 908 may perform the DAPS handover. In some aspects, the handover component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A non-transitory computer-readable medium storing a set of instructions for wireless communication, the set of instructions comprising:
one or more instructions that, when executed by one or more processors of a user equipment (UE), cause the UE to:
receive a bandwidth part (BWP) switching configuration in connection with a dual active protocol stack (DAPS) handover,
wherein the BWP switching configuration is based at least in part on a BWP switching rule associated with a first BWP, associated with a source cell and comprising a first downlink BWP and a first uplink BWP, and a second BWP, associated with a target cell and comprising a second downlink BWP and a second uplink BWP, and
wherein the BWP switching rule indicates at least one of:
the second downlink BWP being a subset of the first downlink BWP such that a bandwidth of the second downlink BWP is within a bandwidth of the first downlink BWP, or
the second uplink BWP being a subset of the first uplink BWP such that a bandwidth of the second uplink BWP is within a bandwidth of the first uplink BWP; and
perform the DAPS handover.

2. The non-transitory computer-readable medium of claim 1, wherein the BWP switching rule indicates BWP switching is permitted for the first BWP if:
the first downlink BWP, in the first BWP, contains the second downlink BWP in the second BWP, and
the first uplink BWP, in the first BWP, contains the second uplink BWP in the second BWP.

3. The non-transitory computer-readable medium of claim 1, wherein, when the DAPS handover is an intra-frequency handover.

4. The non-transitory computer-readable medium of claim 1, wherein the BWP switching rule indicates that the second downlink BWP is the subset of the first downlink BWP such that the bandwidth of the second downlink BWP is within the bandwidth of the first downlink BWP, and
wherein the first downlink BWP and the second downlink BWP are each active.

5. The non-transitory computer-readable medium of claim 1, wherein the BWP switching rule indicates that the second uplink BWP is the subset of the first uplink BWP such that the bandwidth of the second uplink BWP is within the bandwidth of the first uplink BWP, and
wherein the first uplink BWP and the second uplink BWP are each active.

6. The non-transitory computer-readable medium of claim 1, wherein the one or more instructions, that cause the UE to receive the BWP switching configuration, cause the UE to:
receive the BWP switching configuration during the DAPS handover.

7. The non-transitory computer-readable medium of claim 1, wherein the BWP switching rule indicates that BWP switching is not permitted on a communication link for an intra-frequency handover when the UE is associated with a single communication chain for the communication link.

8. The non-transitory computer-readable medium of claim 1, wherein the BWP switching rule indicates that BWP switching is permitted on a communication link for an intra-frequency handover when the UE is associated with multiple communication chains for the communication link.

9. The non-transitory computer-readable medium of claim 1, wherein the first BWP is configured as a first component carrier and the second BWP is configured as a second component carrier.

10. The non-transitory computer-readable medium of claim 1, wherein the first BWP is configured as a first leg of a multi-transmit/receive point (multi-TRP) communication and the second BWP is configured as a second multi-TRP communication.

11. A non-transitory computer-readable medium storing a set of instructions for wireless communication, the set of instructions comprising:
one or more instructions that, when executed by one or more processors of a network node, cause the network node to:
configure a bandwidth part (BWP) switching configuration of a user equipment (UE) in connection with a dual active protocol stack (DAPS) handover based at least in part on a BWP switching rule associated with a first BWP, associated with a source cell and comprising a first downlink BWP and a first uplink BWP, and a second BWP, associated with a target cell and comprising a second downlink BWP and a second uplink BWP,
wherein the BWP switching rule indicates at least one of:
the second downlink BWP being a subset of the first downlink BWP such that a bandwidth of the second downlink BWP is within a bandwidth of the first downlink BWP, or
the second uplink BWP being a subset of the first uplink BWP such that a bandwidth of the second uplink BWP is within a bandwidth of the first uplink BWP; and
perform the DAPS handover.

12. The non-transitory computer-readable medium of claim 11, wherein the BWP switching rule indicates BWP switching is permitted for the first BWP if: the first downlink BWP, in the first BWP, contains the second downlink BWP in the second BWP, and
the first uplink BWP, in the first BWP, contains the second uplink BWP in the second BWP.

13. The non-transitory computer-readable medium of claim 11, wherein the DAPS handover is an intra-frequency handover.

14. The non-transitory computer-readable medium of claim 11, wherein the one or more instructions, that cause the network node to configure the BWP switching configuration, cause the network node to:
configure the UE to switch at least one of the first BWP or the second BWP during the DAPS handover.

15. The non-transitory computer-readable medium of claim 11, wherein, when the DAPS handover is an inter-frequency handover, configuring the BWP switching configuration wherein the one or more instructions further cause the network node to:
configure the first BWP as a first component carrier; and
configure the second BWP as a second component carrier.

16. The non-transitory computer-readable medium of claim 11, wherein, when the DAPS handover is an inter-frequency handover, configuring the BWP switching configuration wherein the one or more instructions further cause the network node to:
- configure the first BWP as a first leg of a multi-transmit/receive point (multi-TRP) communication; and
- configure the second BWP as a second leg of the multi-TRP communication.

17. The non-transitory computer-readable medium of claim 11, wherein the BWP switching rule indicates that BWP switching is not permitted on a communication link for an intra-frequency handover when the UE is associated with a single communication chain for the communication link.

18. The non-transitory computer-readable medium of claim 11, wherein the BWP switching rule indicates that BWP switching is permitted on a communication link for an intra-frequency handover when the UE is associated with multiple communication chains for the communication link.

19. The non-transitory computer-readable medium of claim 11, wherein the BWP switching rule indicates that the second downlink BWP is the subset of the first downlink BWP such that the bandwidth of the second downlink BWP is within the bandwidth of the first downlink BWP, and
- wherein the first downlink BWP and the second downlink BWP are each active.

20. The non-transitory computer-readable medium of claim 11, wherein the BWP switching rule indicates that the second uplink BWP is the subset of the first uplink BWP such that the bandwidth of the second uplink BWP is within the bandwidth of the first uplink BWP, and
- wherein the first uplink BWP and the second uplink BWP are each active.

\* \* \* \* \*